(12) United States Patent
Kemper et al.

(10) Patent No.: US 7,726,116 B2
(45) Date of Patent: Jun. 1, 2010

(54) TURBOFAN ENGINE NOZZLE ASSEMBLY AND METHOD OF OPERATING SAME

(75) Inventors: Paul D. Kemper, Loveland, OH (US); Thomas Ory Moniz, Loveland, OH (US); Jorge Francisco Seda, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 869 days.

(21) Appl. No.: 11/559,748

(22) Filed: Nov. 14, 2006

(65) Prior Publication Data

US 2008/0110154 A1    May 15, 2008

(51) Int. Cl.
F02K 3/02    (2006.01)
(52) U.S. Cl. .................................... 60/226.3; 60/226.1
(58) Field of Classification Search ............... 60/226.1, 60/770, 771, 226.3, 262; 239/265.19; 244/54; 248/554
See application file for complete search history.

(56) References Cited

U.S. PATENT DOCUMENTS

| | | | | |
|---|---|---|---|---|
| 3,015,936 A | * | 1/1962 | Brewer et al. | 239/265.19 |
| 3,018,620 A | * | 1/1962 | Meyer | 239/265.19 |
| 4,043,508 A | * | 8/1977 | Speir et al. | 239/265.19 |
| 4,077,206 A | * | 3/1978 | Ayyagari | 60/262 |
| 5,221,048 A | | 6/1993 | Lair | |
| 5,251,435 A | | 10/1993 | Pauley | |
| 5,372,006 A | * | 12/1994 | Lair | 60/226.2 |
| 5,655,360 A | * | 8/1997 | Butler | 60/226.2 |
| 5,746,047 A | * | 5/1998 | Steyer et al. | 60/39.5 |
| 5,785,249 A | * | 7/1998 | Metezeau et al. | 239/265.19 |
| 5,799,903 A | * | 9/1998 | Vauchel | 244/110 B |
| 5,833,140 A | | 11/1998 | Loffredo et al. | |
| 5,853,148 A | | 12/1998 | Standish et al. | |
| 5,996,937 A | * | 12/1999 | Gonidec et al. | 244/110 B |
| 6,253,540 B1 | * | 7/2001 | Chew et al. | 60/262 |
| 6,502,383 B1 | * | 1/2003 | Janardan et al. | 60/226.1 |
| 6,546,716 B2 | | 4/2003 | Lair | |
| 6,820,410 B2 | | 11/2004 | Lair | |
| 6,938,408 B2 | | 9/2005 | Lair | |
| 6,945,031 B2 | * | 9/2005 | Lair | 60/226.1 |
| 6,966,175 B2 | * | 11/2005 | Lair | 60/226.1 |
| 6,983,588 B2 | * | 1/2006 | Lair | 60/226.1 |
| 7,430,852 B2 | * | 10/2008 | Beutin et al. | 60/226.1 |
| 2008/0112801 A1 | * | 5/2008 | Moniz et al. | 415/208.1 |
| 2009/0320486 A1 | * | 12/2009 | Gutmark et al. | 60/770 |

* cited by examiner

*Primary Examiner*—William H Rodríguez
(74) *Attorney, Agent, or Firm*—William Scott Andes, Esq.; Armstrong Teasdale LLP (57) ABSTRACT

A nozzle assembly for a gas turbine aircraft engine is provided. The nozzle assembly includes a nacelle and a core cowl positioned at least partially within the nacelle such that the core cowl and the nacelle are aligned substantially concentrically to each other defining an annular fan bypass duct. A first member couples the nacelle to the core cowl and includes a first flap hingedly coupled to each sidewall of the first member. An opposing second member couples the nacelle to the core cowl and includes a second flap hingedly coupled to each sidewall of the second member. The first flaps and the second flaps are selectively positionable between a first operational position and a second operational position to vary a throat area of said fan bypass duct. A turbofan engine assembly and a method for operating the same are also provided.

16 Claims, 8 Drawing Sheets

TURBOFAN ENGINE NOZZLE ASSEMBLY AND METHOD OF OPERATING SAME

BACKGROUND OF THE INVENTION

This invention relates generally to airflow in turbofan engines, and more specifically to regulating the airflow through the fan duct area.

At least one known turbofan engine assembly includes a fan assembly and a core gas turbine engine enclosed in an annular core cowl. Additionally, a fan nacelle surrounds a portion of the core gas turbine engine. The core cowl and fan nacelle generally form a fan nozzle duct area (A18). While operating the turbofan engine assembly, a portion of the air flowing from the fan assembly flows through the core gas turbine engine and another portion of the air flows through the fan nozzle duct area.

In some turbofan engine assemblies, the fan nozzle duct area can be manipulated in order to alter engine performance. For example, some turbofan engines utilize a translating core cowl as a thrust reverser without blocker doors by essentially reducing the fan nozzle duct area.

Additional methods and assemblies are needed to vary the fan nozzle duct area to increase cycle performance at take-off and descent portions.

BRIEF DESCRIPTION OF THE INVENTION

In one aspect, a method for operating a turbofan engine assembly including a core gas turbine engine is provided. The method includes varying an operating speed of the turbofan engine assembly from a first operating speed to a second operating speed. The method also includes selectively positioning at least one of a first set of flaps and a second set of flaps to vary a throat area of a fan nozzle duct defined downstream from the core gas turbine engine to facilitate improving engine efficiency at the second operating speed. The first set of flaps and the second set of flaps are downstream from the core gas turbine engine and inside the fan nozzle duct.

In another aspect, a nozzle assembly for a gas turbine aircraft engine is provided. The nozzle assembly includes a nacelle and a core cowl positioned at least partially within the nacelle such that the core cowl and the nacelle are aligned substantially concentrically to each other such that an annular fan bypass duct is defined between the nacelle and the core cowl. The nozzle assembly further includes a first member that couples the nacelle to the core cowl. The first member includes opposing sidewalls and a first flap hingedly coupled to each of the first member sidewalls. A second member opposite the first member couples the nacelle to the core cowl. The second member includes opposing sidewalls and a second flap hingedly coupled to each of the second member sidewalls, wherein the first flaps and the second flaps are selectively positionable between a first operational position and a second operational position to vary a throat area of said fan bypass duct.

In another aspect, a turbofan engine assembly is provided. The turbofan engine assembly includes a core gas turbine engine, a nacelle, and a core cowl positioned at least partially within the nacelle such that the core cowl and the nacelle are aligned substantially concentrically to each other such that an annular fan bypass duct is defined between the nacelle and the core cowl. A first member couples the nacelle to the core cowl. The first member includes opposing sidewalls and a first flap hingedly coupled to each of the first member sidewalls. A second member opposite the first member couples the nacelle to the core cowl. The second member includes opposing sidewalls and a second flap hingedly coupled to each of the second member sidewalls, wherein the first flaps and the second flaps are selectively positionable between a first operational position and a second operational position to vary a throat area of the fan bypass duct.

DETAILED DESCRIPTION OF THE INVENTION

The present invention relates to turbofan engines and nozzle assemblies. As used herein, "nozzle assembly" is directed to a portion of the turbofan engine that includes at least the aft portion, and also includes portions/sections of the nacelle, core cowl, and fan and exhaust ducts.

Figure 1:
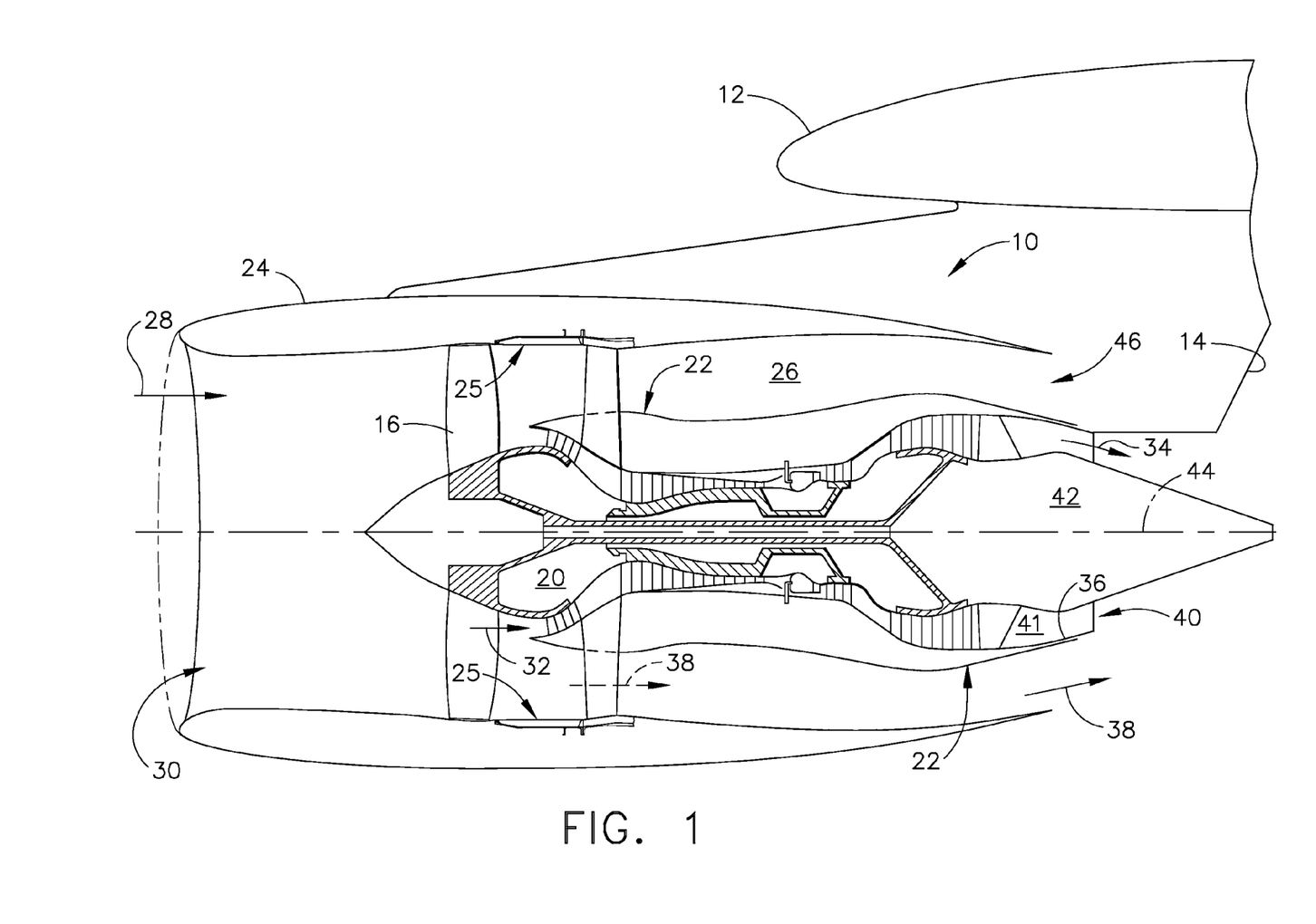
FIG. 1 is a schematic side view of an exemplary aircraft turbofan engine assembly.

FIG. 1 is a schematic side view of an exemplary aircraft turbofan engine assembly 10 having a longitudinal axis/centerline 44. Turbofan engine assembly 10 is mounted to a wing 12 of the aircraft using a pylon 14. In the exemplary embodiment, turbofan engine assembly 10 includes a core gas turbine engine 20 that includes a high-pressure compressor, a combustor, and a high-pressure turbine (all not shown). Turbofan engine assembly 10 also includes a low-pressure turbine that is disposed axially downstream from core gas turbine engine 20, and a fan assembly 16 that is disposed axially upstream from core gas turbine engine 20.

Figure 2:
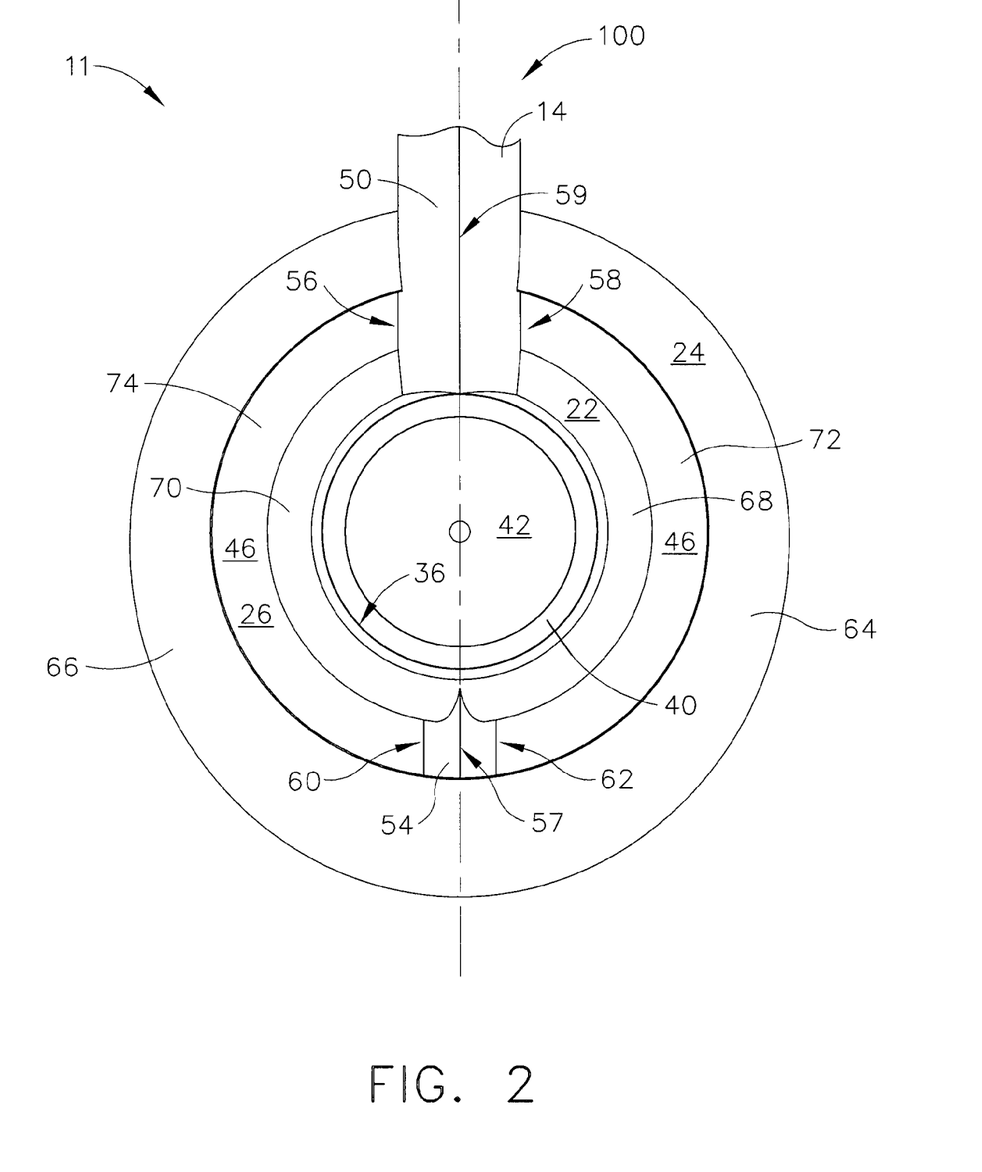
FIG. 2 is an end view of an exemplary nozzle assembly used with the turbine engine of FIG. 1.

In the exemplary embodiment, core gas turbine engine 20 is enclosed in an annular core cowl 22. Nacelle 24 surrounds fan assembly 16 and a portion of the core cowl 22. An annular bypass duct 26 (also referred to as a fan nozzle duct) is defined between core cowl 22 and an inner surface 25 of nacelle 24. As shown in FIGS. 1 and 2, at an aft end portion of core gas turbine engine 20, core cowl 22 lies adjacent to and surrounds an outer surface of a core nozzle 36.

During operation, ambient air 28 enters an inlet 30 of turbofan engine assembly 10 and flows past fan assembly 16. A combustion portion 32 of air 28 is channeled through core gas turbine engine 20, compressed, mixed with fuel, and ignited to generate combustion gases 34. Combustion gases 34 are discharged from an outlet 40 of an annular core duct 41 defined between core nozzle 36 and an optional center plug 42 disposed coaxially or concentrically therein around longitudinal axis/centerline 44 (also shown in FIG. 2). A bypass portion 38 of air 28 is channeled downstream through annular bypass duct 26 and discharged from bypass duct 26 at an outlet 46. In some alternate embodiments, turbofan engine assembly 10 may include a thrust reverser assembly (not shown).

FIG. 2 illustrates an end view of a nozzle assembly 11 from the perspective of centerline 44 (shown in FIG. 1). In one embodiment, nozzle assembly 11 is a bifurcated nozzle assembly. Nozzle assembly 11 includes nacelle 24, core cowl 22, and outlet 46 of bypass duct 26. In the exemplary embodiment, nacelle 24 and core cowl 22 are coupled to wing 12 (shown in FIG. 1) by pylon 14. Nozzle assembly 11 includes a first member 50 and an opposing second member 54. Member 50 is substantially coplanar with pylon 14 and extends through an upper portion of nacelle 24, bypass duct 26, core cowl 22, and core nozzle 36. A conduit (not shown) is defined within and extends through pylon 14 and member 50. The conduit allows electrical communication for engine assembly 10 with a control system of the aircraft. While two members 50, 54 are shown in FIG. 2, any quantity can be used with nozzle assembly 11.

Member 54 extends through a bottom portion of nacelle 24, core nozzle 36 and core cowl 22 and is substantially coplanar with pylon 14. In some embodiments, member 54 includes a strut or support member. As shown in FIG. 2, members 50, 54 are aligned substantially with the vertical plane defined by line 100. The vertical plane includes centerline 44 and, in one embodiment, is substantially perpendicular to wing 12 (shown in FIG. 1). Although typical installations of engine assembly 10 do not vary from the vertical plane shown in FIG. 2, other embodiments of the present invention exist. For example, engine assembly 10 could be mounted on a fuselage with a horizontal pylon.

Member 50 includes opposing sidewalls 56, 58, and member 54 includes opposing sidewalls 60, 62. Sidewalls 56, 58, 60, 62, shown in FIG. 2, extend through bypass duct 26 toward the forward end of assembly 10 (shown in FIG. 1). Each member 50, 54 further defines a width between opposing sidewalls 56, 58 and 60, 62, respectively. In one embodiment, the width of member 54 is less than a width of member 50. The conduits of members 50, 54 at least partially separate nacelle 24 and core cowl 22 into substantially symmetrical arcuate nacelle portions, 64, 66 and arcuate cowl portions 68, 70, respectively. In some embodiments, arcuate nacelle portions 64, 66 of nacelle 24 are hingedly coupled to member 50. Members 50, 54 divide bypass duct 26 (not enumerated in FIG. 2) forming substantially symmetrical duct portions, 72 and 74, respectively. Symmetrical duct portions 72, 74 may have any conventional configuration. In one embodiment, duct portion 72 is defined by a radially inner surface of arcuate nacelle portion 64, a radially outer surface of arcuate cowl portion 68, sidewall 58 of member 50, and sidewall 62 of member 54. Similarly, in one embodiment, duct portion 74 is defined by a radially inner surface of arcuate nacelle portion 66, a radially outer surface of arcuate cowl portion 70, sidewall 56 of member 50, and sidewall 60 of member 54.

Figure 3:
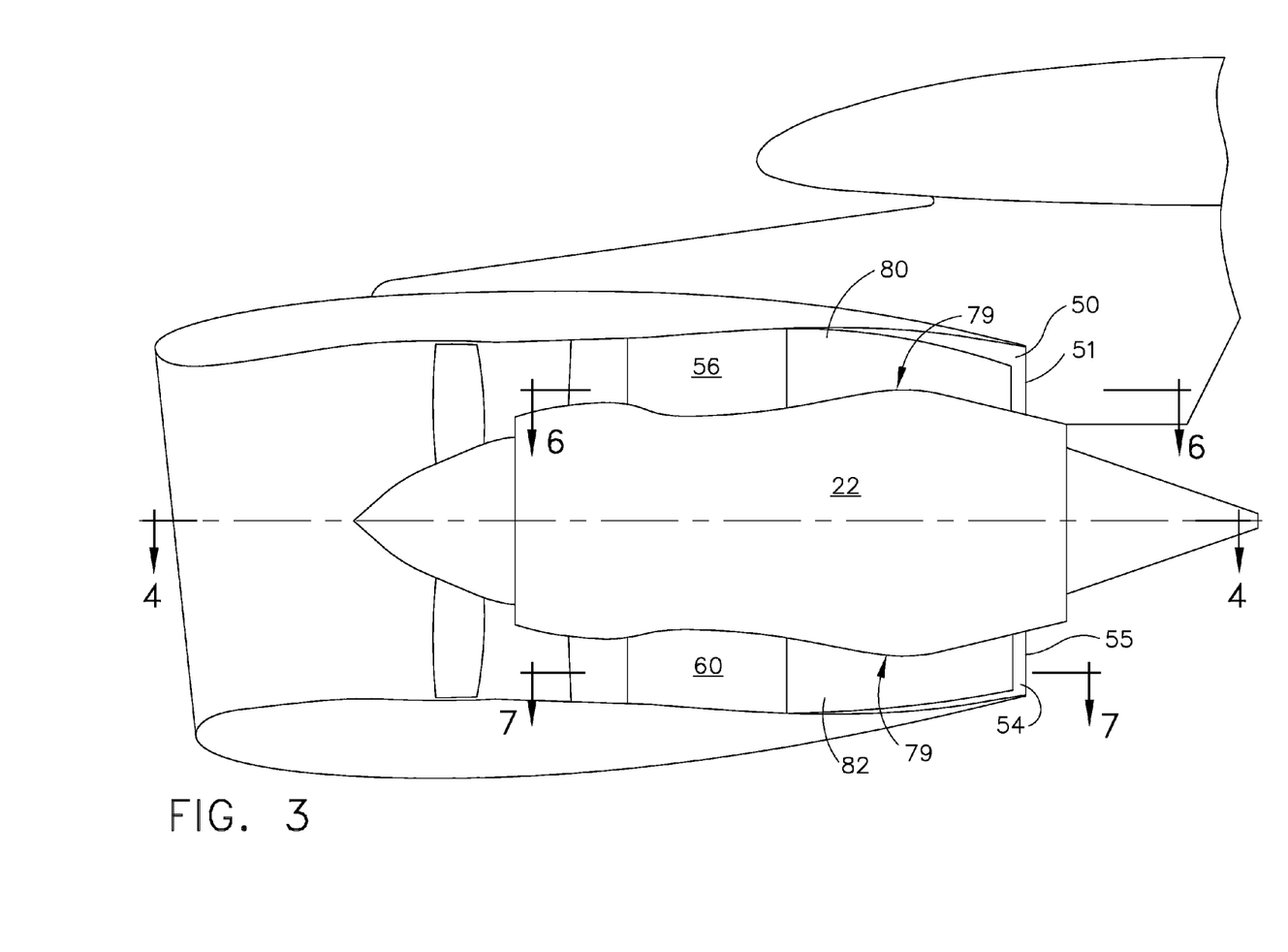
FIG. 3 is a side view of the exemplary nozzle assembly of FIG. 2.

FIG. 3 is a side view of the exemplary nozzle assembly 11. As core cowl 22 extends downstream core cowl 22 forms a bulge portion 79 that affects the shape of bypass duct 26. Hingedly coupled to each sidewall 56 and 58 of first member 50 is a flap 80, forming a set of flaps 80 (also shown in FIGS. 5-9). In some embodiments, flap 80 is hingedly coupled to sidewalls 56, 58 before the apex of bulge portion 79. In some embodiments (as shown in FIG. 3) flap 80 is hingedly coupled to sidewalls 56, 58 near the beginning of bulge portion 79 (i.e., toward the forward portion of engine assembly 10). Flap 80 extends substantially to an edge 51 of first member 50. In one embodiment, flap 80 has a length from about 45% to about 65% the length of sidewalls 56, 58.

Figure 5:
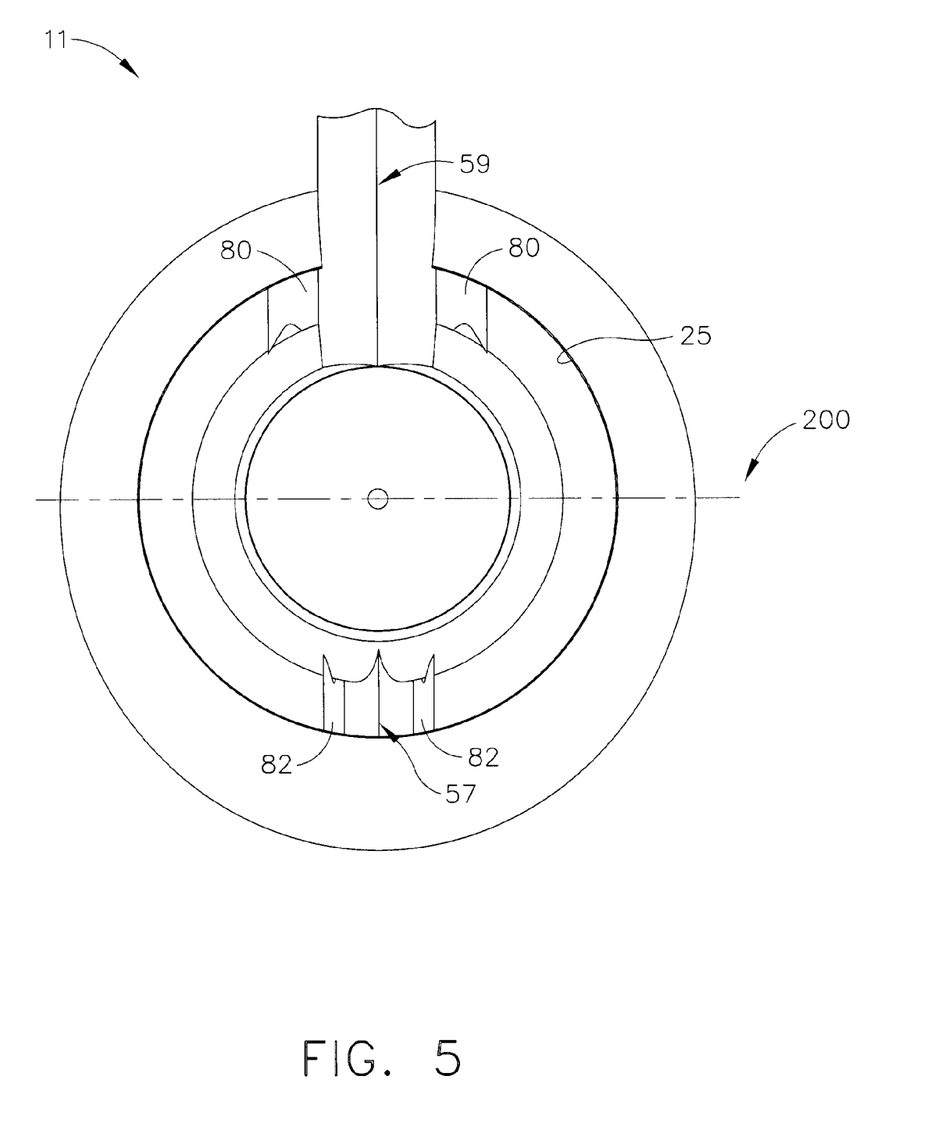
FIG. 5 is another end view of the exemplary nozzle assembly while the flaps are deployed.
Figure 6:
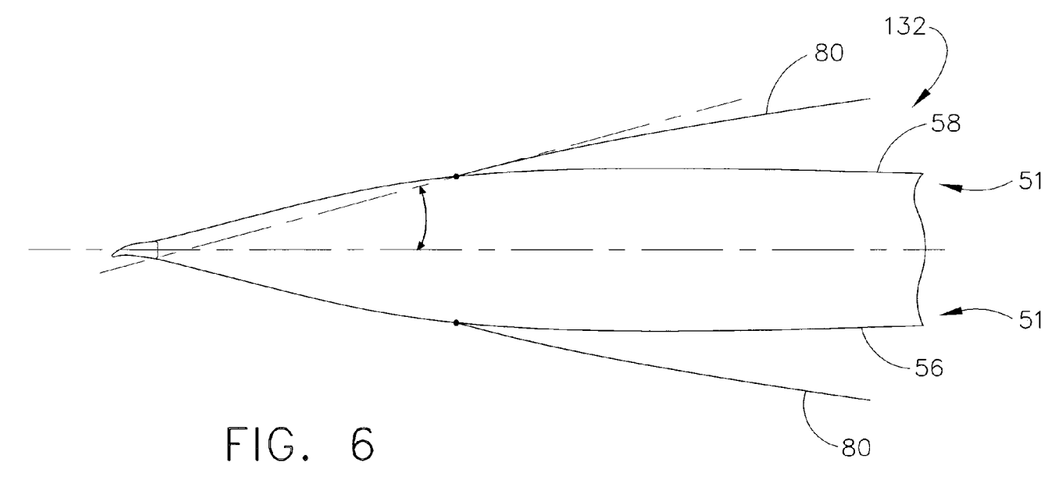
FIGS. 6 and 7 are each an outline view of the nozzle assembly of FIG. 3 while the flaps are deployed.
Figure 7:
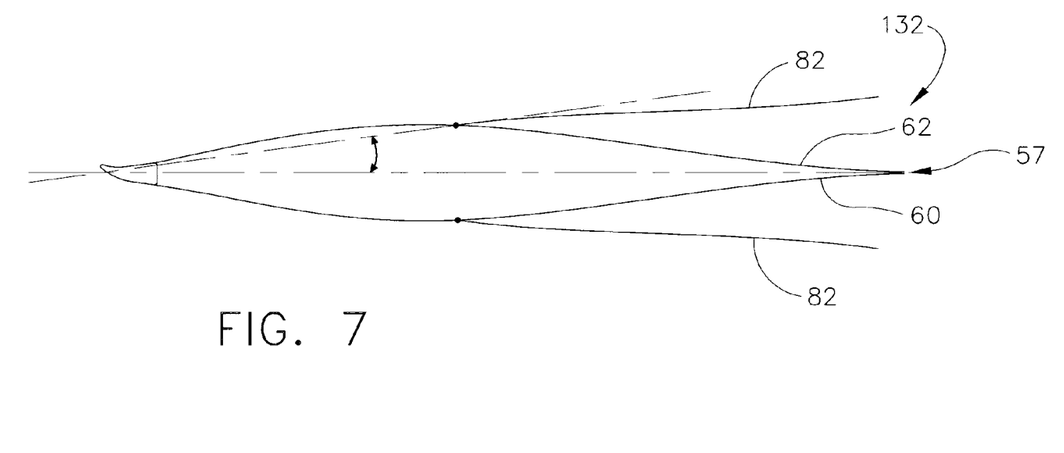

Likewise, hingedly coupled to each sidewall 60 and 62 of second member 54 is a flap 82, forming a set of flaps 82 (also shown in FIGS. 5-7). In some embodiments, flap 82 is hingedly coupled to sidewalls 60, 62 upstream from bulge portion 79 as shown in FIG. 3. In other embodiments, flap 82 is hingedly coupled to sidewalls 60, 62 approximately on bulge portion 79. Flap 82 extends substantially to an edge 55 of second member 54. In one embodiment, flap 80 has a length from about 45% to about 65% the length of sidewalls 60, 62.

Although FIGS. 2 and 3 show two members 50, 54, other embodiments of the present invention exist. For example, engine assembly 10 could include four members, two within the vertical plane and two within a horizontal plane. Furthermore, each of the four members could include two opposing sidewalls with flaps.

In some embodiments, edge 51 of first member 50 extends further along the longitudinal axis 44 than edge 55 of second member 54. Alternatively, edges 51, 55 of members 50, 54, respectively, can be substantially linear. Furthermore, as shown in FIGS. 2, 3, and 7, in one embodiment sidewalls 60, 62 of second member meet at the aft end of the nozzle assembly to form an end portion 57. Likewise, sidewalls 56, 58 of first member meet at the aft end of the nozzle assembly to form an end portion 59, which may also have at triangular shape.

Figure 4:
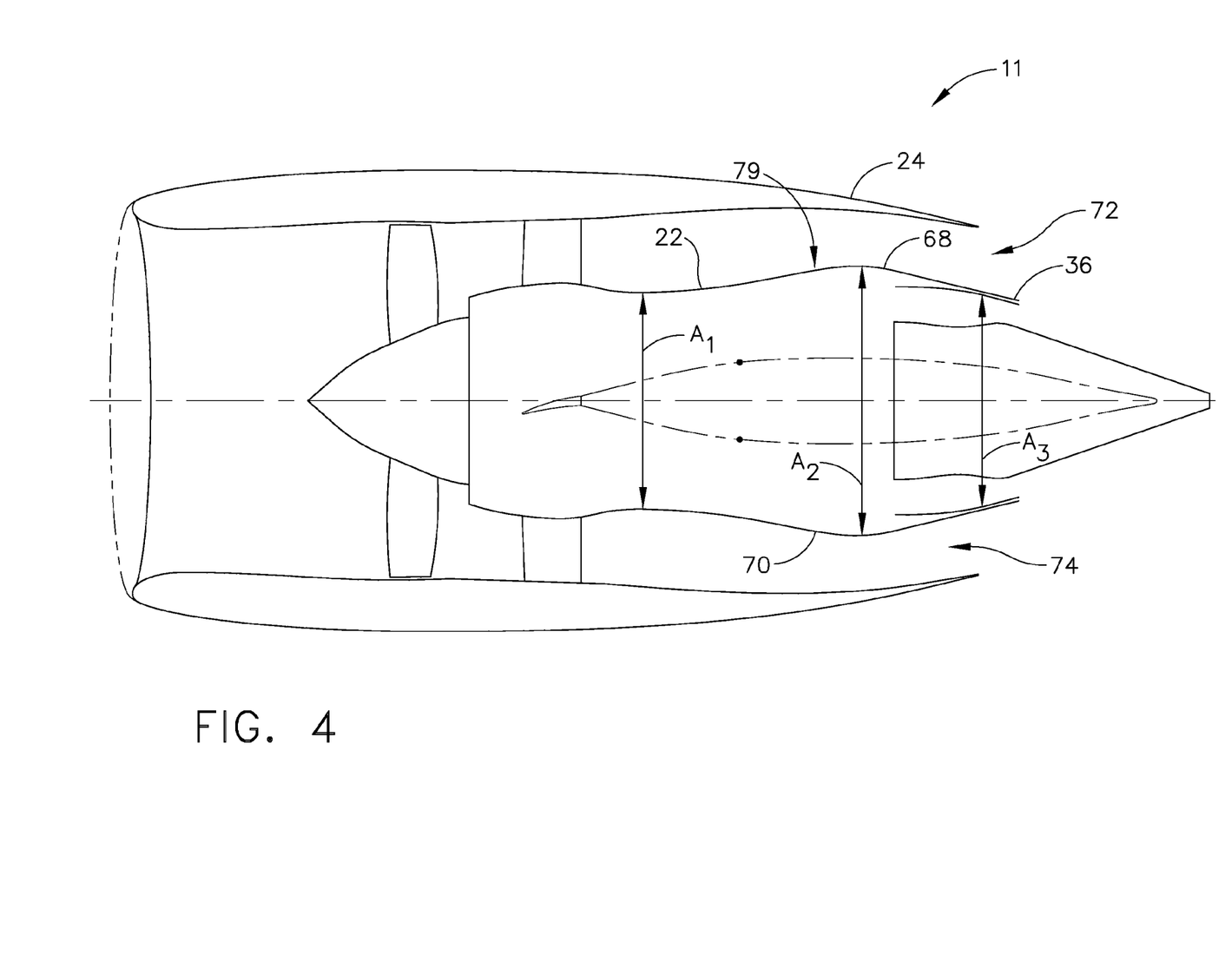
FIG. 4 is an outline view of the nozzle assembly of FIG. 3.

FIG. 4 illustrates an outline view of nozzle assembly 11 along line 4-4 of FIG. 3. Bulge portion 79 is illustrated by a first area $A_1$, a second area $A_2$, and a third area $A_3$. First area $A_1$ is located at an upstream position of nozzle assembly 11; second area $A_2$ is positioned downstream from first area $A_1$; and third area $A_3$ is positioned downstream from second area $A_2$. In the exemplary embodiment, first area $A_1$ and third area $A_3$ are less than second area $A_2$, thus forming bulge portion 79.

Figure 8:
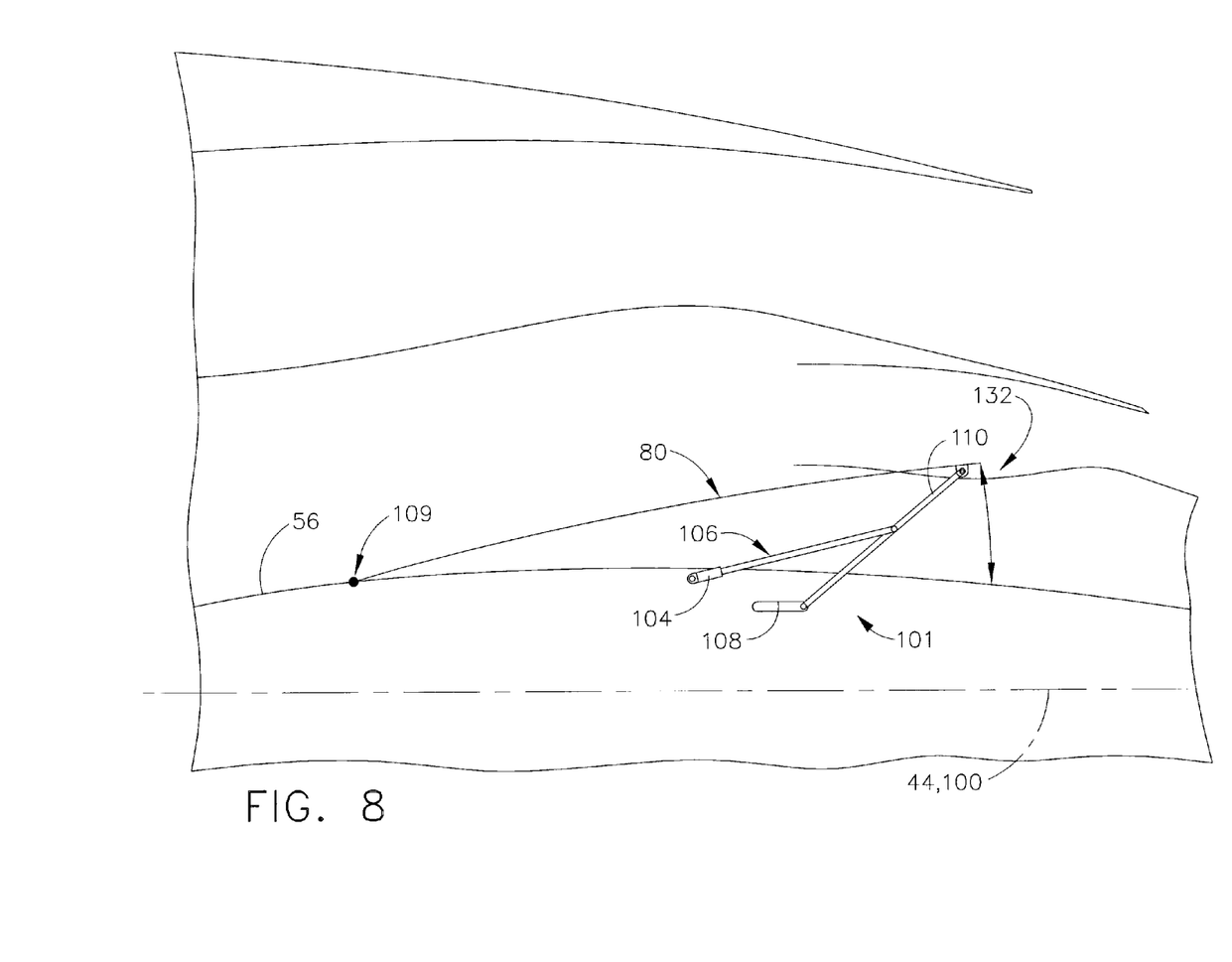
FIG. 8 illustrates a partial outline view of the nozzle assembly of FIG. 2 in a second operational position.
Figure 9:
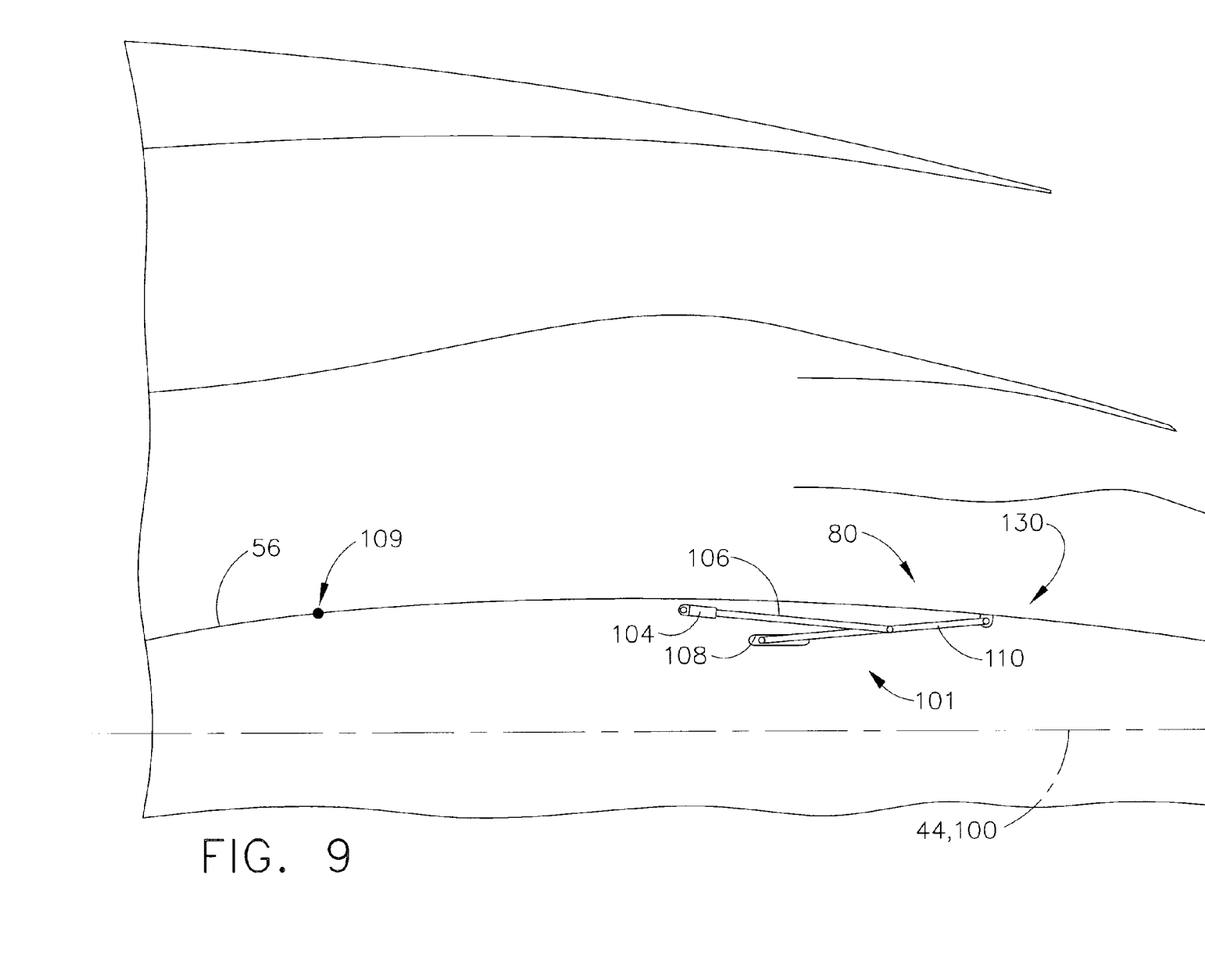
FIG. 9 illustrates a partial outline view of the nozzle assembly of FIG. 2 in a first operational position.

Embodiments of the present invention facilitate varying airflow and/or obstructing airflow 38 as the air flows through bypass duct 26 (or duct portions 72, 74) and before the air is discharged (shown in FIGS. 5-7). In order to reduce or obstruct the airflow in bypass duct 26, a first set of flaps 80 and/or a second set of flaps 82 are deployed to pivot (e.g., along a hinge 109) from a first operational position 130 to a second operational position 132 into bypass duct 26 as shown in FIGS. 8-9. In some embodiments, the set of flaps 80 and the set of flaps 82 can be deployed independently from the other set.

Reducing the fan nozzle duct area during certain operating conditions, such as take-off or descent, can improve fuel burn by raising the fan operating line closer to the peak efficiency line. In addition, reduced noise is achieved as a result of reduced fan wake/outlet guide vane (OGV) interaction. Moreover, opening the fan nozzle during certain operating conditions, such as low altitude, can also reduce noise as a result of reduced jet velocity. The noise reduction benefit of varying the fan nozzle (VFN) can also be traded to further reduce fan diameter and corresponding fuel burn.

As shown in FIG. 5, in some embodiments, an upper edge of each flap 80 extends to inner surface 25 of nacelle 24 such that flap 80 can freely slide along inner surface 25. In other embodiments, the upper edge does not extend to inner surface 25.

In one embodiment, flaps 80 are configured to deploy at an angle of 20° with respect to the centerline indicated by line 100 while flaps 82 are configured to deploy at an angle of 10°. In some embodiments, a lower edge of each flap 82 extends to inner surface 25 of nacelle 24 such that flap 82 can freely slide along inner surface 25. In other embodiments, the lower edge does not extend to inner surface 25.

FIGS. 6 and 7 illustrate flaps 80 and flaps 82, respectively, each in a second operational position 132. As illustrated in FIG. 5, when the nozzle assembly is in operation, both sets of flaps 80, 82 pivot away from the respective sidewall 56, 58 and 60, 62 and into duct portions, 72, 74, (or along a horizontal plane defined by line 200). By repositioning flaps 80, 82 laterally outward, airflow 38 is reduced and/or obstructed. Thus, when the aircraft experiences aerodynamic losses, such as during take-off or descent, flaps 80, 82 can be repositioned to improve the fuel burn or reduce the noise of nozzle assembly 11.

Deployment of flaps 80, 82 is generally accomplished by using links, actuators, or other mechanisms, as shown in FIGS. 8 and 9. In one embodiment, each flap 80, 82 is coupled by a hinge 102 to the corresponding sidewall. An actuator 101 can be positioned within the conduit of members 50, 54, or, alternatively, actuator 101 can be positioned within core cowl 22. As shown in FIG. 8, actuator 101 includes a motor 104, an extending rod 106 coupled to motor 104 and also to a link 110. Link 110 connects the corresponding flap to a slot 108 such that energizing the motors facilitates moving the flap in either an outward direction along the horizontal plane or an inward direction. In the exemplary embodiment, actuator 101 may be electrically, pneumatically, or hydraulically powered to facilitate laterally moving the corresponding flap from first operational position 130, or stowed position, in which the flaps are fully retracted against the corresponding sidewalls, to the second operational position 132 (shown in FIG. 8), wherein the flaps are laterally extended from the corresponding sidewalls in an outward direction.

The present invention also includes a method for operating a turbofan engine assembly including a core gas turbine engine. The method includes varying an operating speed of the turbofan engine assembly from a first operating speed to a second operating speed. The method also includes selectively positioning at least one of a first set of flaps and a second set of flaps to vary a throat area of a fan nozzle duct defined downstream from the core gas turbine engine to facilitate improving engine efficiency at the second operating speed. The first set of flaps and the second set of flaps are downstream from the core gas turbine engine and inside the fan nozzle duct.

Described herein is a nozzle assembly that may be utilized on a variety of turbofan gas turbine engines coupled to an aircraft. Specifically, the nozzle assembly having flaps positioned within the bypass fan duct, which is described herein, improves engine performance during certain flight conditions by reducing the bypass duct dimensions (i.e., reducing and/or obstructing airflow), which prevents air from flowing through bypass duct and improves fuel burn or reduces the noise. More specifically, the flaps while in the second operational position reduce the available space for airflow. The nozzle assembly is a relatively low cost and low weight modification to the turbofan engine. By improving the engine efficiency during take-off and descent with use of the nozzle assembly, the engine has approximately a 1.0% better fuel-burn than other known engines with a dimension defined between the core cowl and the nacelle that is fixed.

An exemplary embodiment of a nozzle assembly for a gas turbine engine is described above in detail. The assembly illustrated is not limited to the specific embodiments described herein, but rather, components of each assembly may be utilized independently and separately from other components described herein.

While the invention has been described in terms of various specific embodiments, those skilled in the art will recognize that the invention can be practiced with modification within the spirit and scope of the claims.

What is claimed is:

1. A method for operating a turbofan engine assembly including a core gas turbine engine, said method comprising:

varying an operating speed of the turbofan engine assembly from a first operating speed to a second operating speed; and selectively positioning at least one of a first set of flaps and a second set of flaps to vary a throat area of a fan nozzle duct defined downstream from the core gas turbine engine, wherein the first set of flaps and the second set of flaps are coupled downstream from the core gas turbine engine and inside the fan nozzle duct, wherein at least one flap of said first set of flaps are longer than at least one flap of said second set of flaps.

2. A method in accordance with claim 1 wherein selectively positioning at least one of a first set of flaps and a second set of flaps further comprises positioning each of the first set of flaps and each of the second set of flaps at an angle.

3. A method in accordance with claim 1 wherein selectively positioning at least one of a first set of flaps and a second set of flaps further comprises positioning each flap to increase the throat area of fan nozzle duct.

4. A method in accordance with claim 1 wherein selectively positioning at least one of a first set of flaps and a second set of flaps further comprises positioning each flap at an angle with respect to a centerline extending through the turbofan engine assembly, wherein the angle is from about 0° to about 20°.

5. A method in accordance with claim 1 wherein selectively positioning at least one of a first set of flaps and a second set of flaps further comprises positioning each flap of the first set of flaps at a first angle with respect to a centerline extending through the turbofan engine assembly wherein the first angle is from about 0° to about 20°, and positioning each flap of the second set of flaps at a second angle with respect to the centerline wherein the angle is from about 0° to about 10°.

6. A nozzle assembly for a gas turbine aircraft engine, said nozzle assembly comprising:

a nacelle;

a core cowl positioned at least partially within said nacelle such that said core cowl and said nacelle are aligned substantially concentrically to each other such that an annular fan bypass duct is defined between said nacelle and said core cowl;

a first member coupling said nacelle to said core cowl, said first member comprising opposing sidewalls and a first flap hingedly coupled to each of said first member sidewalls;

a second member opposite said first member and coupling said nacelle to said core cowl, said second member comprising opposing sidewalls and a second flap hingedly coupled to each of said second member sidewalls, wherein said first flaps and said second flaps are selectively positionable between a first operational position and a second operational position to vary a throat area of said fan bypass duct, wherein said first flaps of said first member are longer than said second flaps of said second member.

7. A nozzle assembly in accordance with claim 6 wherein said first member and said second member are aligned substantially coplanarly with respect to each other and divide said fan bypass duct into two duct portions that have substantially the same flow area.

8. A nozzle assembly in accordance with claim 6 wherein each flap of said first flaps and said second flaps are selectively positionable at an angle from about 0° to about 20° measured with respect to a centerline extending through the gas turbine aircraft engine.

9. A nozzle assembly in accordance with claim 6 wherein each of said first and second members has a width, the width of said second member is smaller than said first member width.

10. A nozzle assembly in accordance with claim 6 wherein said nozzle assembly further comprises a plurality of actuators, each said actuator couples one of said flaps to said corresponding sidewall.

11. A nozzle assembly in accordance with claim 10 wherein each actuator includes an actuating mechanism and an extending rod connecting said actuating mechanism to a link, such that energizing said actuating mechanism facilitates moving said flap.

12. A turbofan engine assembly comprising:
   a core gas turbine engine;
   a nacelle;
   a core cowl positioned at least partially within said nacelle such that said core cowl and said nacelle are aligned substantially concentrically to each other such that an annular fan bypass duct is defined between said nacelle and said core cowl;
   a first member coupling said nacelle to said core cowl, said first member comprising opposing sidewalls and a first flap hingedly coupled to each of said first member sidewalls; and
   a second member opposite said first member and coupling said nacelle to said core cowl, said second member comprising opposing sidewalls and a second flap hingedly coupled to each of said second member sidewalls, wherein said first flaps and said second flaps are selectively positionable between a first operational position and a second operational position to vary a throat area of said fan bypass duct, wherein
   wherein said first flap of said first member are longer than said second flap of said second member.

13. A turbofan engine assembly in accordance with claim 12 wherein said first member and said second member are aligned substantially coplanarly with respect to each other and divide said fan bypass duct into two duct portions that have substantially the same flow area.

14. A turbofan engine assembly in accordance with claim 12 wherein each flap of said first flaps and said second flaps are selectively positionable at an angle from about 0° to about 20° measured with respect to a centerline extending through the turbofan engine assembly.

15. A turbofan engine assembly in accordance with claim 12 wherein each of said first and second members includes a width, the width of said second member is smaller than said first member width.

16. A turbofan engine assembly in accordance with claim 12 wherein said turbofan engine assembly further comprises a plurality of actuators, each said actuator couples one of said flaps to said corresponding sidewall.

\* \* \* \* \*